United States Patent
Atkinson (10) Patent No.: US 10,714,964 B2
(45) Date of Patent: Jul. 14, 2020

(54) CHARGING A BATTERY OF A COMPUTING DEVICE

(71) Applicant: HEWLETT-PACKARD DEVELOPMENT COMPANY, L.P., Houston, TX (US)

(72) Inventor: Lee Atkinson, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 22 days.

(21) Appl. No.: 16/067,726

(22) PCT Filed: Mar. 29, 2016

(86) PCT No.: PCT/US2016/024807
§ 371 (c)(1),
(2) Date: Jul. 2, 2018

(87) PCT Pub. No.: WO2017/171735
PCT Pub. Date: Oct. 5, 2017

(65) Prior Publication Data
US 2019/0020215 A1 Jan. 17, 2019

(51) Int. Cl.
*H02J 7/04* (2006.01)
*G06F 1/3212* (2019.01)
*G06F 1/3234* (2019.01)
*H02J 7/00* (2006.01)
*H02J 50/05* (2016.01)
(Continued)

(52) U.S. Cl.
CPC .............. *H02J 7/04* (2013.01); *G06F 1/3212* (2013.01); *G06F 1/3234* (2013.01); *H02J 7/0063* (2013.01); *H02J 7/0068* (2013.01); *G06F 1/3265* (2013.01); *H02J 7/0048* (2020.01); *H02J 7/025* (2013.01); *H02J 50/05* (2016.02); *H02J 50/10* (2016.02); *H02J 2007/0067* (2013.01)

(58) Field of Classification Search
CPC ........................................................ H02J 7/04
USPC ........................................................ 320/107
See application file for complete search history.

(56) References Cited

U.S. PATENT DOCUMENTS

| | | | |
|---|---|---|---|
| 5,511,205 A * | 4/1996 | Kannan | G06F 1/30 712/E9.032 |
| 5,541,489 A | 7/1996 | Dunstan | |

(Continued)

FOREIGN PATENT DOCUMENTS

| | | |
|---|---|---|
| EP | 2782211 A1 | 9/2014 |
| JP | 2005182626 A | 7/2005 |

(Continued)

OTHER PUBLICATIONS

"BU-406: Battery as a Buffer", Feb. 23, 2016.

*Primary Examiner* — Jerry D Robbins
(74) *Attorney, Agent, or Firm* — Fabian VanCott (57) ABSTRACT

A method of charging a battery of a computing device includes determining an amount of charge remaining in a battery coupled to the computing device. The method further includes, in response to a determination that the amount of charge remaining in the battery has decreased more than a first predetermined percentage since connection to a power source during a first predetermined amount of time, adjusting a power state of at least one power consuming circuit of the computing device other than the battery.

20 Claims, 4 Drawing Sheets

(51) Int. Cl.
    *H02J 50/10*           (2016.01)
    *H02J 7/02*            (2016.01)

(56) References Cited

U.S. PATENT DOCUMENTS

| | | | |
|---|---|---|---|
| 5,847,543 A * | 12/1998 | Carroll | G06F 1/1632 320/125 |
| 5,998,972 A * | 12/1999 | Gong | H02J 7/0077 320/134 |
| 6,222,347 B1 * | 4/2001 | Gong | G06F 1/263 320/134 |
| 6,329,794 B1 | 12/2001 | Oeda et al. | |
| 6,470,290 B1 | 10/2002 | Lee et al. | |
| 7,017,061 B2 * | 3/2006 | Lippert | G06F 1/30 713/320 |
| 7,281,146 B2 * | 10/2007 | Nalawadi | G06F 1/3203 713/320 |
| 2003/0188210 A1 * | 10/2003 | Nakazato | G06F 1/3203 713/320 |
| 2011/0025258 A1 | 2/2011 | Huang et al. | |
| 2012/0062183 A1 | 3/2012 | Lin | |
| 2014/0184143 A1 * | 7/2014 | Coakley | H02J 4/00 320/107 |
| 2015/0293569 A1 | 10/2015 | Yu | |
| 2015/0309547 A1 | 10/2015 | Huang et al. | |

FOREIGN PATENT DOCUMENTS

| | | |
|---|---|---|
| JP | 2013074723 A | 4/2013 |
| KR | 10-2015-0099284 A | 8/2015 |

\* cited by examiner

CHARGING A BATTERY OF A COMPUTING DEVICE

BACKGROUND

Electronic devices such as computing devices are supplied with an alternating current (AC) adapter in order to supply power to the electronic device. The AC adapter may also serve to charge a battery electronically coupled to the electronic device. The electronic device may be sold or otherwise provided with an AC adapter that is suited to the electronic device's power consumption parameters.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

An A/C adapter is paired with an electronic device and sold therewith in a manner such that the A/C adapter and its power output is able to provide an effective level of power to match the power consumption levels of the electronic device at a normal or average operation level. The market has determined that if, for example, the electronic device may function properly using either a 65 watt A/C adapter or a 45-watt adapter, it is advantageous to pair the electronic device with the relatively cheaper 45-watt adapter in order to save in the costs of manufacturing and shipping.

Hybrid mode systems are electrical systems that include both a battery within the electronic device and an A/C. adapter, that use both of these sources as power sources, and that allow for the battery within the electronic device to be charged during operation of the electronic device. Thus, the use of the simultaneous power output of both an AC adapter and a battery in a computing device may be referred to as a "hybrid" or "shared" power architecture.

In hybrid mode, the battery and the A/C adapter work in common to supply the load created by the consumption of power by the electronic device. A hybrid mode system allows a user to carry a relatively smaller wattage A/C adapter such as, for example, a USB Power Delivery (USB-PD) interface such as a USB Type-C port adapter that carries approximately between two and ten watts, rather than a relatively larger A/C adapter such as a 65-watt adapter. A user may, however, be uncertain as to whether a hybrid A/C adaptor will charge the battery of the electronic device during operation of the electronic device since the output of the A/C adapter may be small. In some instances, an electronic device that uses a hybrid mode system may cause the power consumption of its various power consuming circuits to be lowered. Lowering or decreasing the power consumption may be performed by causing the power consuming circuits to operate at a low-power state, operate slower, or otherwise reduce their power consumption to allow for the charging of the battery to occur.

Examples described herein provide a method of charging a battery of a computing device including determining an amount of charge remaining in a battery coupled to the computing device. The method further includes, in response to a determination that the amount of charge remaining in the battery has decreased more than a first predetermined percentage since connection to a power source during a first predetermined amount of time, adjusting a power state of at least one power consuming circuit of the computing device other than the battery. In one example, the first predetermined amount of time may be approximately 10 minutes, and the first predetermined percentage may be approximately 5%.

The method may include, in response to a determination that the amount of charge remaining in the battery is less than a second predetermined percentage and did not increase more than a third predetermined percentage during a second predetermined amount of time, adjusting the power state of the at least one power consuming circuit of the computing device other than the battery. In one example, the second predetermined amount of time may be approximately 60 minutes, the second predetermined percentage may be approximately 80%, and the third predetermined percentage may be approximately 20%.

Examples described herein provide a system for charging a battery of a computing device. The system includes a controller communicatively coupled to a processor of the computing device. The controller determines an amount of charge remaining in a battery coupled to the computing device. In response to a determination that the amount of charge remaining in the battery has decreased more than a first predetermined percentage since connection to a power source during a first predetermined amount of time, the controller decreases a power state of at least one power consuming circuit of the computing device other than the battery. Further, in response to a determination that the amount of charge remaining in the battery is less than a second predetermined percentage and did not increase more than a third predetermined percentage during a second predetermined amount of time, the controller decreases the power state of the at least one power consuming circuit of the computing device other than the battery.

In one example, the first predetermined amount of time may be approximately 10 minutes, and the first predetermined percentage may be approximately 5%. Further, the second predetermined amount of time may be approximately 60 minutes, the second predetermined percentage may be approximately 80%, and the third predetermined percentage may be approximately 20%. The system may further include a power receiving unit to receive power from a power transmission unit. In one example, the power receiving unit is a wireless power receiving unit.

Examples described herein provide a computer program product for charging a battery of a computing device. The computer program product includes a computer readable storage medium including computer usable program code embodied therewith. The computer usable program code, when executed by a controller, in response to a determination that an amount of charge remaining in a battery has decreased more than a first predetermined percentage since connection to the power source during a first predetermined amount of time, adjusting the power consumption state of at least one power consuming circuit of the computing device other than the battery. In response to a determination that the amount of charge remaining in the battery is less than a second predetermined percentage and did not increase more than a third predetermined percentage during a second predetermined amount of time, adjusting the power consumption state of at least one power consuming circuit of the computing device other than the battery.

The computer usable program code to, when executed by the controller, determines an amount of charge remaining in the battery coupled to the computing device.

Examples described herein provide adapting the power consumption of the computing device as a function of the size of the A/C adapter. The examples use battery charge rate as one of the control mechanisms for performance of the computing device to guarantee that the battery of the computing device gets charged. Adjusting the performance of the CPU may be performed using an embedded control in order to favor battery charge over CPU performance.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
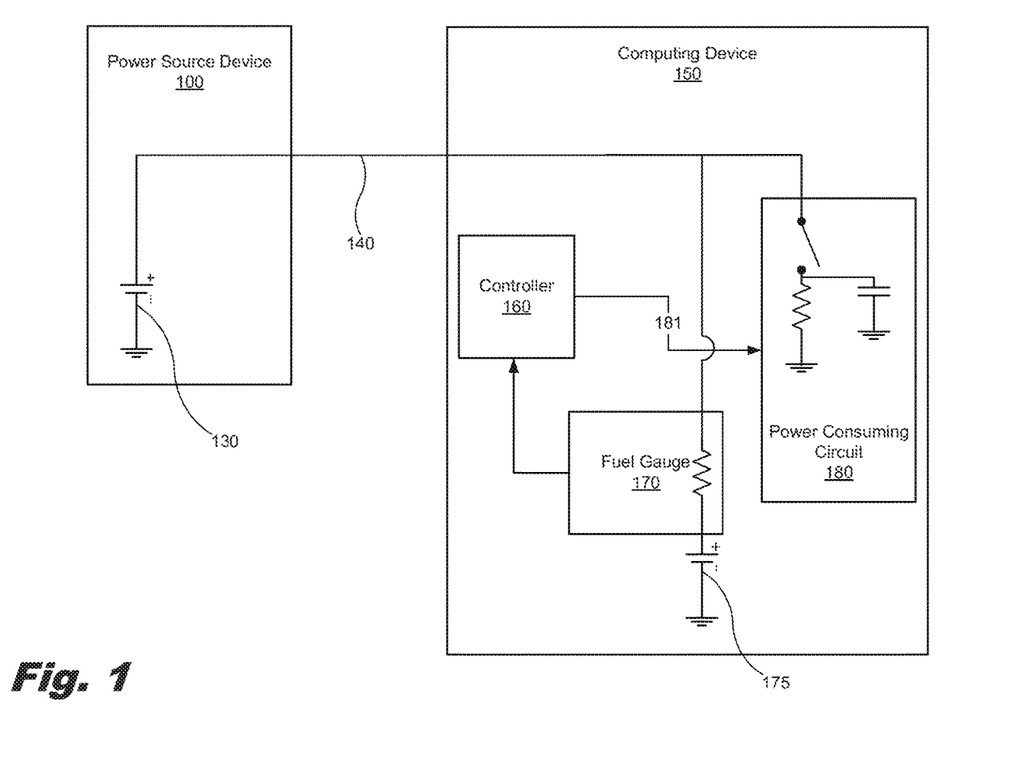
FIG. 1 is a block diagram of a system for charging a battery of a computing device, according to one example of the principles described herein.

Turning now to the figures, FIG. 1 is a block diagram of a system for charging a battery (175) of a computing device (150), according to one example of the principles described herein. The system includes a power source device (100) to provide A/C power to a computing device (150) via supply voltage line (V$_{cc}$)(140).

The system includes a controller (160). The controller (160) determines an amount of charge remaining in a battery (175) coupled to the computing device (150). In one example, the controller (160) is an embedded microcontroller separate from a central processing unit of the computing device (150).

The computing device includes a fuel gauge (170). The fuel gauge is used to determine an amount of charge remaining in the battery (175). In response to a determination that the amount of charge remaining in the battery (175) has decreased more than a first predetermined percentage since connection to a power source (130) of a power source device (100) during a first predetermined amount of time, the controller (160), via control line (181), decreases a power state of at least one power consuming circuit (180) of the computing device (150) other than the battery (175). Further, in response to a determination that the amount of charge remaining in the battery (175) is less than a second predetermined percentage and did not increase more than a third predetermined percentage during a second predetermined amount of time, the controller (160), via control line (181), decreases the power state of the at least one power consuming circuit (180) of the computing device (150) other than the battery (175). Even though only one power consuming circuit (180) is depicted in the figures, more than one power consuming circuit may be included in the computing device (150). More detail regarding these and other elements and their respective functions will now be described in connection with FIG. 2.

Figure 2:
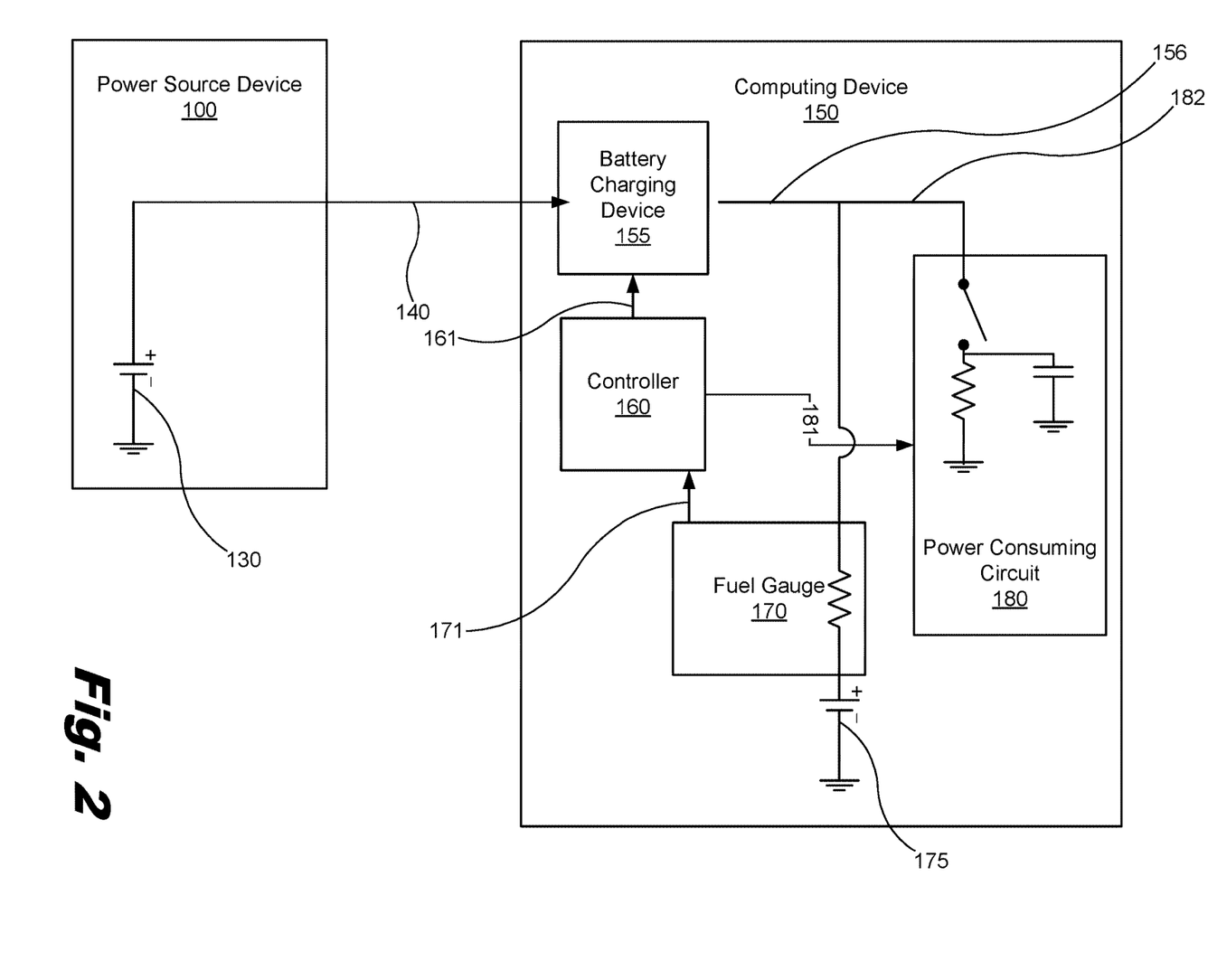
FIG. 2 is a block diagram of a system for charging a battery of a computing device, according to another example of the principles described herein.

FIG. 2 is a block diagram of a system for charging a battery (175) of a computing device (150), according to another example of the principles described herein. The power source device (100) may be any external power source (EPS) capable of providing electrical power to the computing device (150). In one example, the power source device (100) is an A/C adapter. In this example, the A/C adapter couples to a power source (130) such as an electrical socket, and transmits that electrical energy to the computing device (150).

In another example, the power source device (100) is a wireless A/C adapter. A wireless A/C adapter is any wireless power transfer device that transmits electrical energy from an ultimate power source without the use of discrete man-made conductors. Any number of different power transmission technologies may be used in the wireless A/c adapter including, for example, time-varying electric, magnetic, or electromagnetic fields or combinations thereof. In wireless power transfer, a wireless transmitter connected to the power source (130) conveys the field energy across an intervening space to one or more receivers within the computing device (150), where it is converted back to an electrical current and then utilized.

The computing device (150) may be any computing device receiving power from the power source device (100). For example, the computing device (150) may be a peripheral device, a laptop computing device, a desktop computing device, a mobile telecommunications device, a server, a personal digital assistants (PDAs), a smartphone, a gaming system, a tablet computing device, other electronic devices, or combinations thereof. In one example, the power source device (100) and the computing device (150) may be capable of sending and receiving electrical power via a USB-PD connection or interface. In still another example, the power source device (100) and the computing device (150) may be capable of sending and receiving power via a USB Type-C connection or interface.

The computing device (150) includes a power consuming circuit (180). The power consuming circuit (180) may be any circuit that draws power, and may include, for example, a central processing unit (CPU), a display device such as a liquid crystal display (LCD), a data storage device, or other computing circuits within a computing device that may consume power, or combinations thereof. Again, although the computing device (150) is depicted in FIG. 2 as including one power consuming circuit (180), any number of power consuming circuits (180) may be included within the computing device (150). Still further, a plurality of power consuming circuits (180) may be viewed as a whole as a single power consuming circuit such that all power consuming circuits (180) are altered according to the principles described herein as a group. Further, in FIG. 2, the power consuming circuit (180) is depicted as including a resistive element. However, the power consuming circuit (180) may include direct current to direct current (DC/DC) conversion such that the power consuming circuit (180) acts as a constant power load. In this example, power consumption is measured in watts as a product of the voltage source times the current, and lowering the voltage on the output of the battery charging device (155) will result in increased current on the adapter line (156).

The computing device (150) may include a battery (175). The battery (175) may be any device consisting of two or more electrochemical cells that convert stored chemical energy into electrical energy. In the examples of FIGS. 1 and 2, the battery may be a rechargeable battery that can be discharged and recharged any number of times by having their chemical reactions reversed by supplying electrical energy to the cell, approximately restoring their original composition.

The computing device (150) may include a fuel gauge (170). The fuel gauge (170) may be any device that measures the direction and magnitude of current into the battery (175). The fuel gauge (170) also estimates an amount of charge present in the battery (175). This information measured by the fuel gauge (170) is transmitted to the controller (160) via the communication line (171) for use in determining whether to adjust a power state of at least one power consuming circuit (180) of the computing device (150) as described herein.

Current supplied to the battery (175) is provided and controlled by the battery charging device (155) via the battery supply line (176). The current into the battery (175) is measured by fuel gauge (170) as described above, and the battery charging device (155) will adjust the output voltage at the adapter line (156) such that the total current on the Vcc line (140) into the computing device (150) does not exceed the output limit of the power source device (100). For example, if power source device (100) is capable of supplying 10 watts and the power consuming circuit (180) consumes 6 watts via the common line (182), then 4 watts are available for the battery (175) that may be used to charge the battery (175). If, however, in another example, the power consuming circuit (180) consumes 12 watts, and the power source device (100) is capable of supplying 10 watts, then 2 watts are sourced from the battery (175) through the battery supply line (176) to cover the deficit in power from the power source device (100). Thus the hybrid mode system depicted in FIGS. 1 and 2 includes the battery (175) and the power source device (100) (e.g. an A/C adapter) working in common to provide a load to the power consuming circuit (180) of the computing device (150).

The hybrid mode system is able to supply larger amounts of power to the power consuming circuit (180) than only the AC adapter alone may provide. Further, the hybrid mode system has the ability to minimize the amount of battery drain during use of the computing device during even a peak power consumption period of the power consuming circuit (180). Thus, a user may travel with, for example, a both physically small and low-power-outputting 10-watt AC adapter that provides overnight charging, but that still prove adequate for preserving the amount of battery charge within the battery (175) during a subsequent day of operation. The examples described herein balances the amount of performance allowed the computing device (150) against the discharge of the battery (175). Further, the examples described herein provide for high performance during peak loads, but corrects excessive battery discharge by limiting the performance and power consumption of the power consuming circuit (180) after an excessive discharge of the battery (175) has occurred.

Without the examples described herein, system performance may be compromised when a small A/C source (130) outputting relatively fewer watts is connected to the computing device (150). Further, without the examples described herein, the computing device (150) may simply allow complete discharge of the battery (175). Instead, the examples described herein provide full performance of the power consuming circuit (180) of the computing device (150) until the decline of the battery (175), as indicated by the fuel gauge (170), decreases by a predefined amount, or until the total battery capacity (175), as indicated by the fuel gauge (170), is less than a predefined amount.

Figure 3:
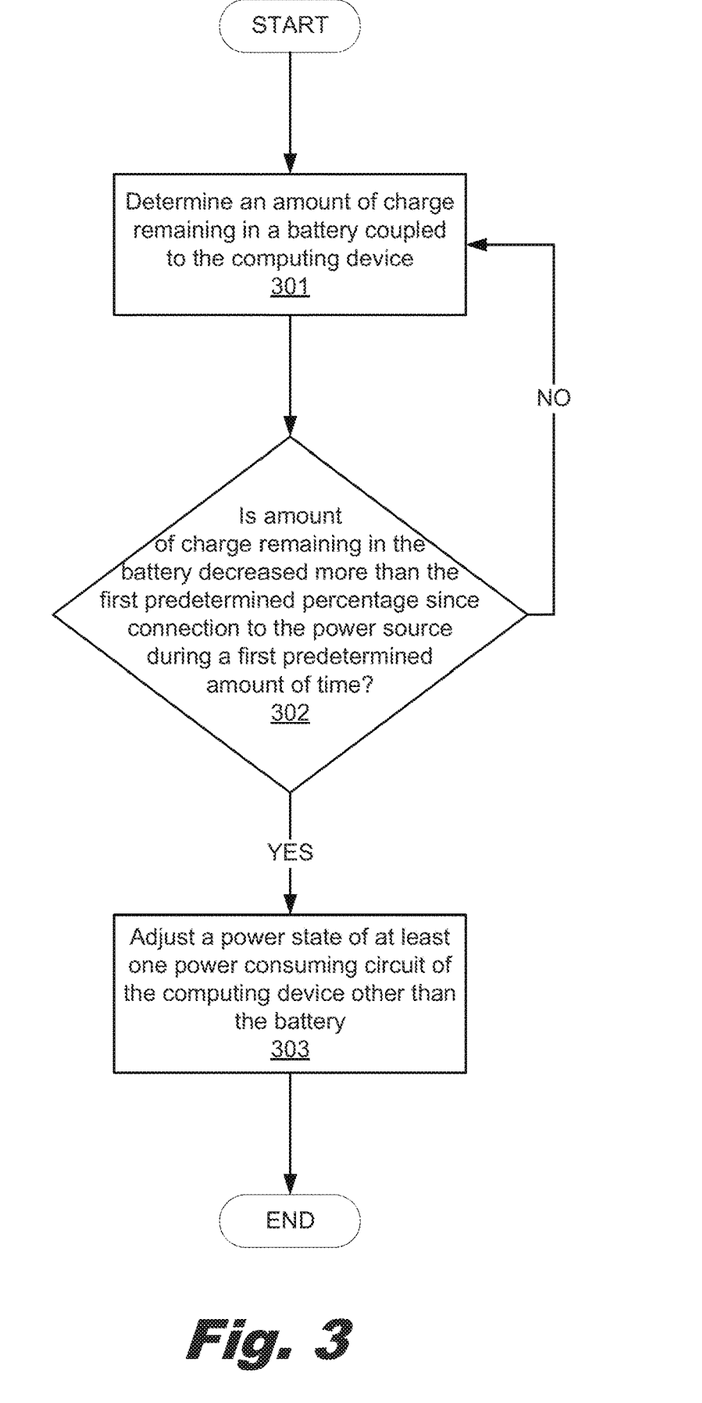
FIG. 3 is a flowchart showing a method charging a battery of a computing device, according to one example of the principles described herein.

The methods employed by the controller (160) of the computing device (150) in bringing about these proposals will now be described in more detail in connection with FIGS. 3 and 4. FIG. 3 is a flowchart showing a method charging a battery of a computing device, according to one example of the principles described herein. The method of FIG. 3 may begin by determining (block 301), with the fuel gauge (170), an amount of charge remaining in the battery (175) coupled to the computing device (150).

In response to a determination that the amount of charge remaining in the battery (175) has decreased more than a first predetermined percentage since connection to the power source (130) of the power source device (100) during a first predetermined amount of time (block 302, determination YES), the controller (160), via control line (181), adjusts (block 303) a power state of at least one power consuming circuit (180) of the computing device (150) other than the battery (175). In this manner, the power consumption of the battery (175) is increased as the power consumption of the power consuming circuits (180) is decreased. If the amount of charge remaining in the battery (175) has not decreased more than a first predetermined percentage since connection to the power source (130) of the power source device (100) during a first predetermined amount of time (block 302, determination NO), then the method loops back to block 301 where the fuel gauge (170) determines the amount of charge remaining in the battery (175).

Figure 4:
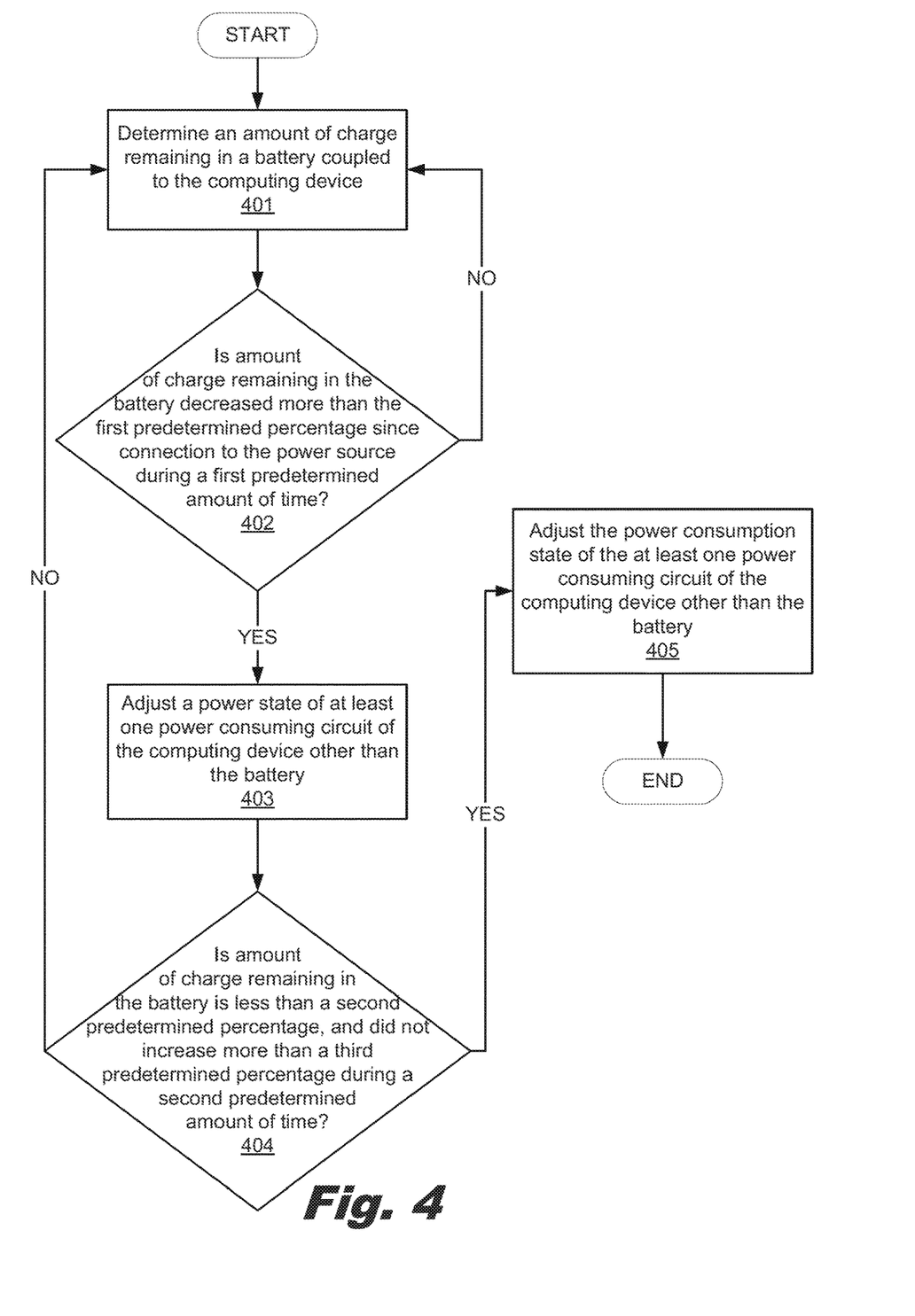
FIG. 4 is a flowchart showing a method of charging a battery of a computing device, according to another example of the principles described herein.

FIG. 4 is a flowchart showing a method of charging a battery (175) of a computing device (150), according to another example of the principles described herein. The method of FIG. 4 may begin as similarly described above in connection with FIG. 3. The method of FIG. 4 may begin by determining (block 401), with the fuel gauge (170), an amount of charge remaining in the battery (175) coupled to the computing device (150). In response to a determination that the amount of charge remaining in the battery (175) has decreased more than a first predetermined percentage since connection to the power source (130) of the power source device (100) during a first predetermined amount of time (block 402, determination YES), the controller (160), via control line (181), adjusts (block 403) a power state of at least one power consuming circuit (180) of the computing device (150) other than the battery (175). In this manner, the power consumption of the battery (175) is increased as the power consumption of the power consuming circuits (180) is decreased. If the amount of charge remaining in the battery (175) has not decreased more than a first predetermined percentage since connection to the power source (130) of the power source device (100) during a first predetermined amount of time (block 402, determination NO), then the method loops back to block 401 where the fuel gauge (170) determines the amount of charge remaining in the battery (175).

In one example, the first predetermined amount of time may be approximately 10 minutes, and the first predetermined percentage may be approximately 5%. With this 10-minute time period in combination with the 5% threshold of decreased charge, a user can rely on the knowledge that the system will prioritize for charging of the battery (175). The system uses the battery charge rate of the battery (175) as a control mechanism for the performance level of the power consuming circuit (180) to ensure that the battery (175) is charged.

In one example, the fuel gauge (170) may make an initial detection of the amount of charge remaining in the battery (175) when the power source device (100) is first connected to the computing device (150). If, for example, the amount of charge remaining in the battery (175) is less than 15%, the controller may restrict, via control line (181), the power consumption of the power consuming circuit (180) or otherwise cause the power consumption circuit (180) to move to a lowest performance level possible. In an example where the power consuming circuit (180) is a processor, the controller (160) may instruct the processor to limit its power state, limit its turbo mode capability, decrease the processor's frequency, place other restrictions on the processor, or combinations thereof. In another example, the controller (160) is to determine a voltage and temperature at a power receiving unit (PRU) of the computing device, such as the processor, every 100 milliseconds; average the voltage at the PRU for approximately a five second running average; in response to the average voltage being lower than a set voltage (Vset) or the temperature of the PRU being over approximately 70° C., lower the configurable thermal design point (cTDP) of the processor; in response to a determination that the cTDP is at a minimum, lower a charge rate of the battery; in response to the temperature of the PRU being over 80° C., send a command to disable charging command to the PRU.

In an example where the power consuming circuit (180) is a display device, the controller (160) may instruct the display device to reduce display brightness, reduce color saturation within the display, reduce the resolution of the display, perform other restrictions that reduce display quality, or combinations thereof. Similar restrictions may be placed on other devices that may be included among or defined as a power consuming circuit (180).

The method may continue with determining (block 404) whether the amount of charge remaining in the battery (175) is less than a second predetermined percentage, and did not increase more than a third predetermined percentage during a second predetermined amount of time. In one example, the second predetermined amount of time may be approximately 60 minutes, the second predetermined percentage may be approximately 80%, and the third predetermined percentage may be approximately between 10% and 20%.

In response to a determination that the amount of charge remaining in the battery (175) is less than the second predetermined percentage and did not increase more than a third predetermined percentage during a second predetermined amount of time (block 404, determination YES), the controller (160) adjusts (block 405) the power consumption state of the at least one power consuming circuit (180) of the computing device (150) other than the battery (175). If the determination at block 404 is NO, then the method loops back to block 401 where the fuel gauge (170) determines the amount of charge remaining in the battery (175).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the controller (160) of the computing device (150) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a method of and a system for charging a battery of a computing device includes determining an amount of charge remaining in a battery coupled to the computing device. The method further includes, in response to a determination that the amount of charge remaining in the battery has decreased more than a first predetermined percentage since connection to a power source during a first predetermined amount of time, adjusting a power state of at least one power consuming circuit of the computing device other than the battery.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of charging a battery of a computing device comprising:
    determining an amount of charge remaining in a battery coupled to the computing device;
    determining the amount of charge in the battery starting when a power source is electrically connected to the battery; and
    in response to a determination that the amount of charge remaining in the battery has decreased more than a first predetermined percentage since connection to a power source during a first predetermined amount of time starting when the power source is electrically connected to the battery, adjusting a power state of at least one power consuming circuit of the computing device other than the battery.

2. The method of claim 1, wherein the first predetermined amount of time is approximately 10 minutes.

3. The method of claim 1, wherein the first predetermined percentage is approximately 5%.

4. The method of claim 1, comprising, in response to a determination that the amount of charge remaining in the battery is less than a second predetermined percentage and did not increase more than a third predetermined percentage during a second predetermined amount of time, adjusting the power state of the at least one power consuming circuit of the computing device other than the battery.

5. The method of claim 4, wherein the second predetermined amount of time is approximately 60 minutes.

6. The method of claim 4, wherein the second predetermined percentage is approximately 80%.

7. The method of claim 4, wherein the third predetermined percentage is approximately 20%.

8. The method of claim 1, further comprising adapting power consumption of the computing device as a function of a size of an Alternating Current (A/C) adaptor that provides the power source for charging the battery and providing power to the computing device.

9. The method of claim 1, further comprising operating a controller that favors battery charging over performance of the computing device to make the determination and adjust the power state of the at least one power consuming circuit of the computing device other than the battery.

10. The method of claim 1, further comprising providing power to the computing device from both the battery and the power source.

11. A system for charging a battery of a computing device comprising:
    a controller communicatively coupled to a processor of the computing device, the controller to:
        determine an amount of charge remaining in a battery coupled to the computing device;
        in response to a determination that the amount of charge remaining in the battery has decreased more than a first predetermined percentage since connection to a power source during a first predetermined amount of time, decreasing a power state of at least one power consuming circuit of the computing device other than the battery; and
        in response to a determination that the amount of charge remaining in the battery is less than a second predetermined percentage and did not increase more than a third predetermined percentage during a second predetermined amount of time, decreasing the power state of the at least one power consuming circuit of the computing device other than the battery.

12. The system of claim 11, wherein:
    the first predetermined amount of time is approximately 10 minutes; and
    the first predetermined percentage is approximately 5%.

13. The system of claim 11, wherein:
    the second predetermined amount of time is approximately 60 minutes;
    the second predetermined percentage is approximately 80%; and
    the third predetermined percentage is approximately 20%.

14. The system of claim 11, comprising a power receiving unit to receive power from a power transmission unit.

15. The system of claim 14, wherein the power receiving unit is a wireless power receiving unit.

16. The system of claim 11, further comprising an Alternating Current (A/C) adaptor that provides the power source for charging the battery, the controller to adapt power consumption of the computing device as a function of a size of the AC adaptor.

17. A computer program product for charging a battery of a computing device, the computer program product comprising:
    a computer readable storage medium comprising computer usable program code embodied therewith, the computer usable program code to, when executed by a controller:
        in response to a determination that an amount of charge remaining in a battery has decreased more than a first predetermined percentage since connection to the power source during a first predetermined amount of time, adjusting the power consumption state of at least one power consuming circuit of the computing device other than the battery; or
        in response to a determination that the amount of charge remaining in the battery is less than a second predetermined percentage and did not increase more than a third predetermined percentage during a second predetermined amount of time, adjusting the power consumption state of at least one power consuming circuit of the computing device other than the battery.

18. The computer program product of claim 17, further comprising computer usable program code to, when executed by the controller, determine an amount of charge remaining in the battery coupled to the computing device.

19. The computer program product of claim 17, further comprising computer usable program code to, when executed by the controller:
    periodically determine a voltage and temperature at a power receiving unit (PRU) of the computing device;
    average the voltage at the PRU over a period of time;
    in response to the average voltage being lower than a set voltage ($V_{set}$) or the temperature of the PRU being over approximately 70° C., adjust operation of a processor of a computing device comprising the controller.

20. The computer program product of claim 19, further comprising computer usable program code to, when executed by the controller,
    in response to the average voltage being lower than a set voltage (Vset) or the temperature of the PRU being over approximately 70° C., decrease an operating parameter of the processor; and
    in response to a determination that that the operating parameter of the processor is a minimum, lower a charge rate of the battery.

* * * * *